United States Patent
Ozturk et al.

(10) Patent No.: US 10,859,367 B2
(45) Date of Patent: Dec. 8, 2020

(54) SYSTEM AND METHOD FOR LOCATING FLUID FLOW ORIFICES ON A COMPONENT

(71) Applicant: General Electric Company, Schenectady, NY (US)

(72) Inventors: Yusuf Eren Ozturk, Istanbul (TR); Jonathan Matthew Lomas, Simpsonville, SC (US); Thomas Robert Reid, Wilmington, DE (US)

(73) Assignee: General Electric Company, Schenectady, NY (US)

( * ) Notice: Subject to any disclaimer, the term of this patent is extended or adjusted under 35 U.S.C. 154(b) by 959 days.

(21) Appl. No.: 15/004,277

(22) Filed: Jan. 22, 2016

(65) Prior Publication Data

US 2016/0223315 A1    Aug. 4, 2016

(30) Foreign Application Priority Data

Jan. 28, 2015  (TR) ............................. 2015/00931

(51) Int. Cl.
*G01B 11/00*       (2006.01)
*H04N 5/225*       (2006.01)
*H04N 7/18*        (2006.01)

(52) U.S. Cl.
CPC ......... *G01B 11/002* (2013.01); *H04N 5/2256* (2013.01); *H04N 7/183* (2013.01)

(58) Field of Classification Search
CPC .............................. H04N 5/2256; F01D 25/00
USPC .......................................................... 348/82
See application file for complete search history.

(56) References Cited

U.S. PATENT DOCUMENTS

| | | | |
|---|---|---|---|
| 5,583,948 A | 12/1996 | Shibayama | |
| 5,859,704 A * | 1/1999 | Fric .................. | G01K 11/20 250/365 |
| 6,909,800 B2 | 6/2005 | Vaidyanathan | |
| 7,305,118 B2 | 12/2007 | Leboeuf et al. | |
| 7,388,980 B2 | 6/2008 | Vaidyanathan | |
| 7,578,178 B2 | 8/2009 | Boyer et al. | |
| 8,244,025 B2 | 8/2012 | Davis et al. | |
| 8,414,264 B2 | 4/2013 | Bolms et al. | |
| 8,477,154 B2 | 7/2013 | Davis et al. | |
| 2002/0089561 A1* | 7/2002 | Weitzel ............... | B41J 2/125 347/19 |
| 2004/0253105 A1 | 12/2004 | Vaidyanathan | |
| 2009/0145504 A1* | 6/2009 | Colletti ............. | F02M 55/025 138/89 |
| 2009/0220349 A1 | 9/2009 | Bolms et al. | |
| 2009/0297336 A1* | 12/2009 | Allen ................. | G01F 1/68 415/118 |
| 2011/0267451 A1* | 11/2011 | Drescher ......... | G01N 21/8806 348/92 |

(Continued)

OTHER PUBLICATIONS

T. Ninomiya et al., "Automatic 2 1/2D Shape Inspection System for Via-Hole Fillings of Green Sheets by Shadow Image Analysis" IEEE pp. 515-520 1989.

*Primary Examiner* — Amir Shahnami
(74) *Attorney, Agent, or Firm* — Armstrong Teasdale LLP

(57) ABSTRACT

A fluid flow orifice locating system for locating fluid flow orifices on a component includes a light source, an image capture device, and a controller operably connected to the image capture device. The controller is configured and disposed to create a fluid flow orifice map of the component based on contrast differences on a surface of the component.

14 Claims, 4 Drawing Sheets

(56) References Cited

U.S. PATENT DOCUMENTS

| | | | | |
|---|---|---|---|---|
| 2013/0163849 | A1* | 6/2013 | Jahnke | G01N 25/72 382/141 |
| 2014/0320861 | A1* | 10/2014 | van den Engh | G01N 21/85 356/440 |
| 2015/0161778 | A1* | 6/2015 | Henderkott | G06T 7/0008 348/129 |
| 2015/0283531 | A1* | 10/2015 | Jones | B01L 3/0262 506/13 |
| 2015/0366438 | A1* | 12/2015 | Wilson | A61B 1/00009 600/102 |

\* cited by examiner

SYSTEM AND METHOD FOR LOCATING FLUID FLOW ORIFICES ON A COMPONENT

BACKGROUND OF THE INVENTION

The subject matter disclosed herein relates to the art of cooling systems and, more particularly, to a system and method for locating fluid flow orifices on a component.

Various mechanisms including cooling systems. Turbomachine systems, for example, typically include a turbomachine coupled to an intake system and a load. The turbomachine typically includes a compressor portion and a turbine portion. The compressor portion may provide cooling to various components of the turbomachine system. More specifically, an airstream passes through the intake system into the compressor portion. The compressor portion forms a compressed air stream that is introduced into the turbine portion. In a gas turbomachine, a portion of the compressed airstream mixes with products of combustion in a combustor assembly forming a hot gas stream that is introduced into the turbine portion through a transition piece. The hot gas stream flows along a hot gas path interacting with various components of the turbine portion.

Another portion of the compressed airstream may be passed through one or more of the components in the turbine portion such as rotor vanes and nozzles. The compressed airstream may exit the components through fluid flow orifices and mix with hot gas stream flowing along the hot gas path. Often times, the components may be covered with a protective coating. The protective coating may be applied during fabrication or as part of a repair process.

BRIEF DESCRIPTION OF THE INVENTION

According to one aspect of an exemplary embodiment, a fluid flow orifice locating system for locating fluid flow orifices on a component includes a light source, an image capture device, and a controller operably connected to the image capture device. The controller is configured and disposed to create a fluid flow orifice map of the component based on contrast differences on a surface of the component.

According to another aspect of an exemplary embodiment, a method of locating fluid flow orifices on a component includes directing a light source at the component, illuminating a surface of the component through the light source, capturing an image of the component, and creating a fluid flow orifice map of the surface from the image.

According to yet another aspect of an exemplary embodiment, a turbomachine system includes a compressor portion including a compressor portion component, a turbine portion including a turbine portion component, and a fluid flow orifice locating system for locating fluid flow orifices on one of the compressor portion component and the turbine portion component. The fluid flow orifice locating system includes a light source, an image capture device, and a controller operably connected to the image capture device. The controller is configured and disposed to create a fluid flow orifice map of the turbomachine component based on contrast differences on a surface of the turbomachine component.

These and other advantages and features will become more apparent from the following description taken in conjunction with the drawings.

BRIEF DESCRIPTION OF DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
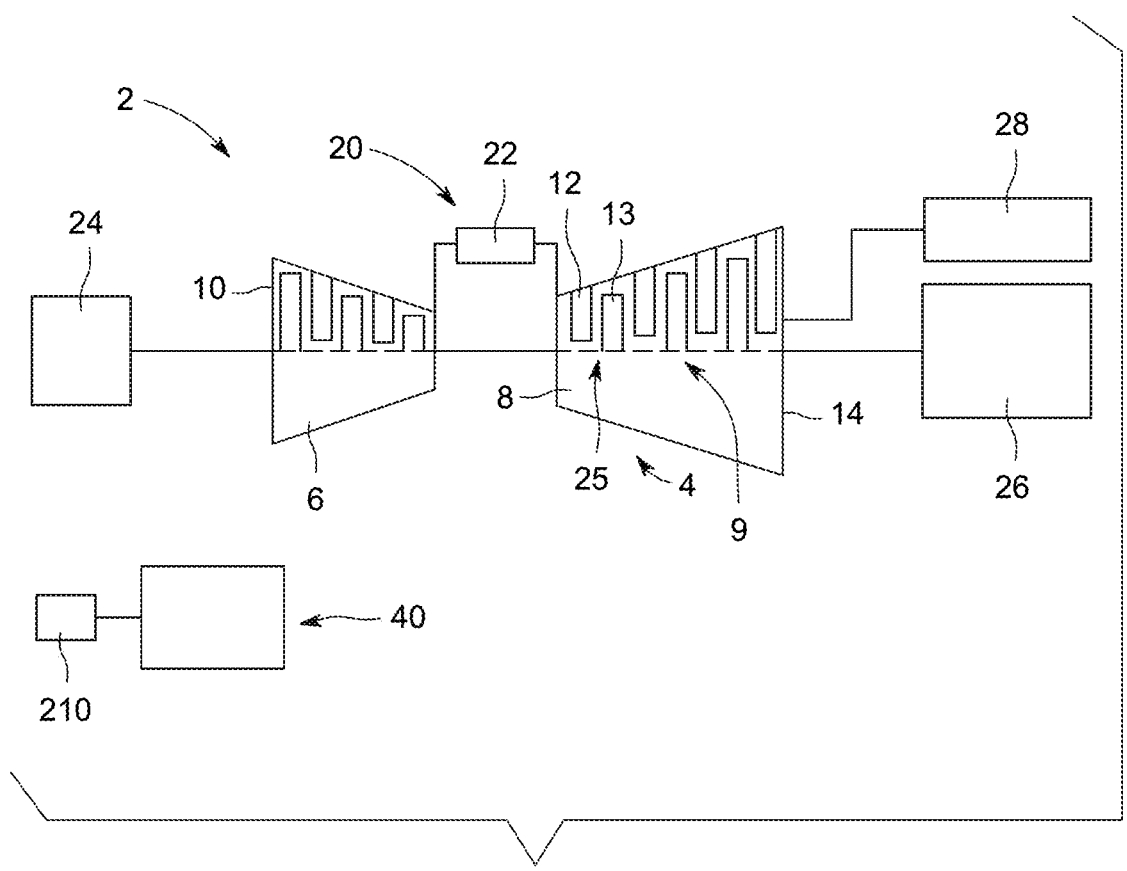
FIG. 1 depicts a schematic view of a turbomachine system including a turbomachine and a fluid flow orifice locating system for locating fluid flow orifices on a component of the turbomachine, in accordance with an exemplary embodiment.

With initial reference to FIG. 1, a turbomachine system is indicated generally at 2. Turbomachine system 2 includes a turbomachine 4 having a compressor portion 6 connected to a turbine portion 8. Compressor portion 6 includes an inlet 10. Compressor portion 6 includes a plurality of stages (not separately labeled). Each stage includes a plurality of stationary nozzles, and a plurality of and rotating buckets or blades (also not separately labeled). Turbine portion 8 includes a plurality of stages 9. Each stage 9 includes a corresponding plurality of nozzles, such as shown at 12, and a plurality of rotating buckets or blades, such as shown at 13. Turbine portion 8 also includes an outlet 14.

A combustor assembly 20 fluidically connects compressor portion 6 and turbine portion 8. Combustor assembly 20 includes one or more combustors 22. Products of combustion pass from each combustor 22 into turbine portion 8 through a corresponding transition piece (not shown). The products of combustion pass along a hot gas path 25 interacting with plurality of stages 9. Turbomachine system 2 is further shown to include an intake system 24 fluidically connected to inlet 10 and a load 26 that may be operatively connected to turbine portion 8. It should be understood that load 26 may also be connected to compressor portion 6. An exhaust system 28 is fluidically connected to outlet 14 of turbine portion 8. Exhaust system 28 receives and conditions exhaust gases passing from turbomachine 4.

Figure 2:
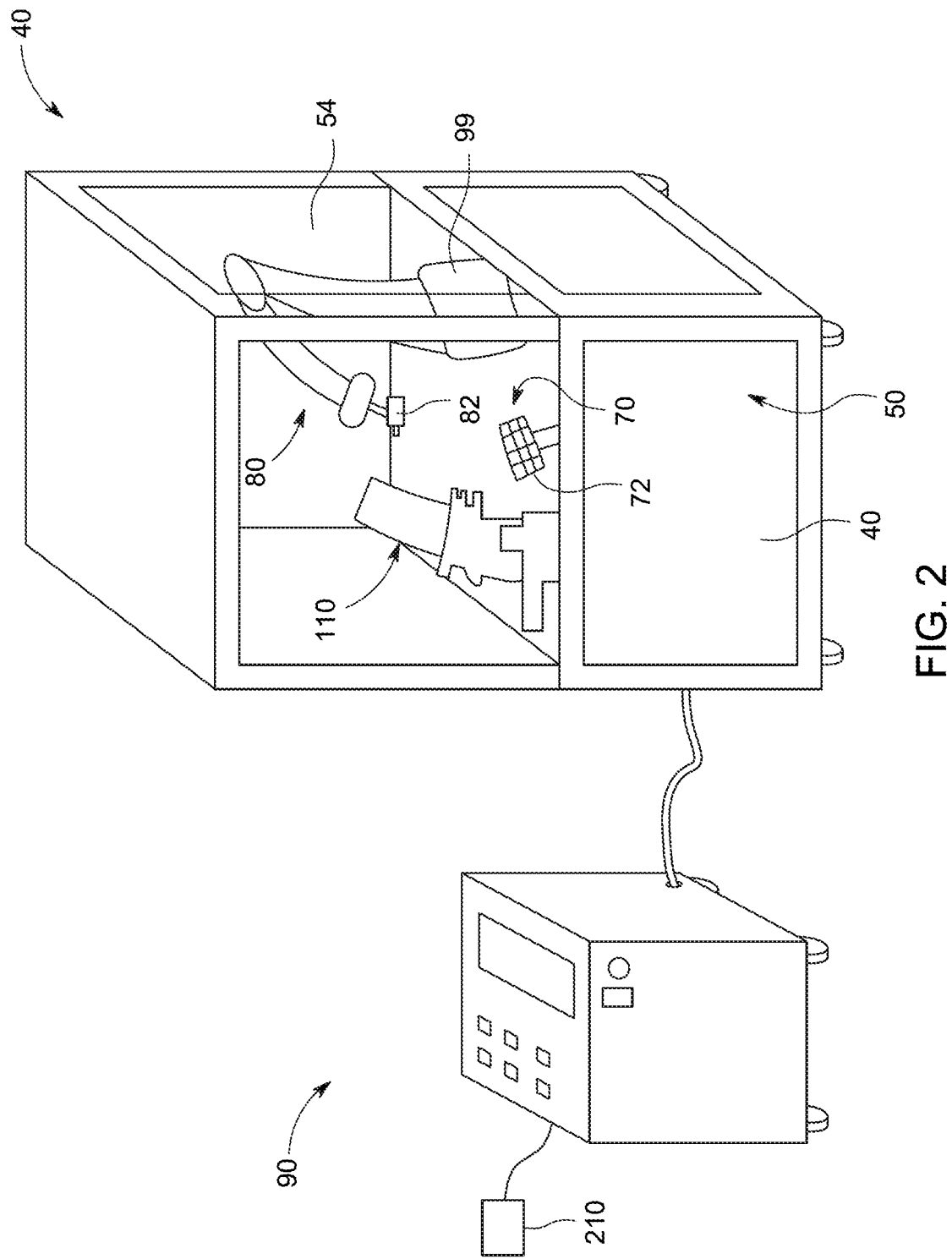
FIG. 2 depicts perspective view of the fluid flow orifice locating system for locating fluid flow orifices, in accordance with an exemplary embodiment.

Turbomachine system 2 also includes a fluid flow orifice locating system 40 for locating fluid flow orifices on a turbomachine component. As shown in FIG. 2, fluid flow orifice locating system 40 includes a housing 50 having a processing chamber 54. A component holding fixture 59 is located in processing chamber 54. As will be discussed more fully below, component holding fixture 59 retains and positions a turbomachine component for processing in fluid flow orifice locating system 40. In addition to component holding fixture 59, a light source 70, which may take the form of one or more white light emitting diodes (LEDs) 72 and an image capture device 80 are arranged in processing chamber 54. At this point, it should be understood that light source 70 may take on a variety of forms including incandescent bulbs, Organic Light Emitting Diodes (OLEDs), and the like. Also, it should be understood that the number of components that make up light source 70 may vary.

Image capture device 80 may take the form of a digital camera 82 having a lens 84. Digital camera 82 is mounted to a multi-axis manipulator 85 and is operably connected to a controller 90 which, as will be detailed more fully below, processes images to determine a location of fluid flow orifices on a turbomachine component. Further, a processing system 99 may also be arranged in processing chamber 54. Processing system 99 may include one or more of a fluid flow orifice clearing system, a masking system, a braze injection system and a mask clearing system. Processing system 99 may also support image capture device 80.

Figure 3:
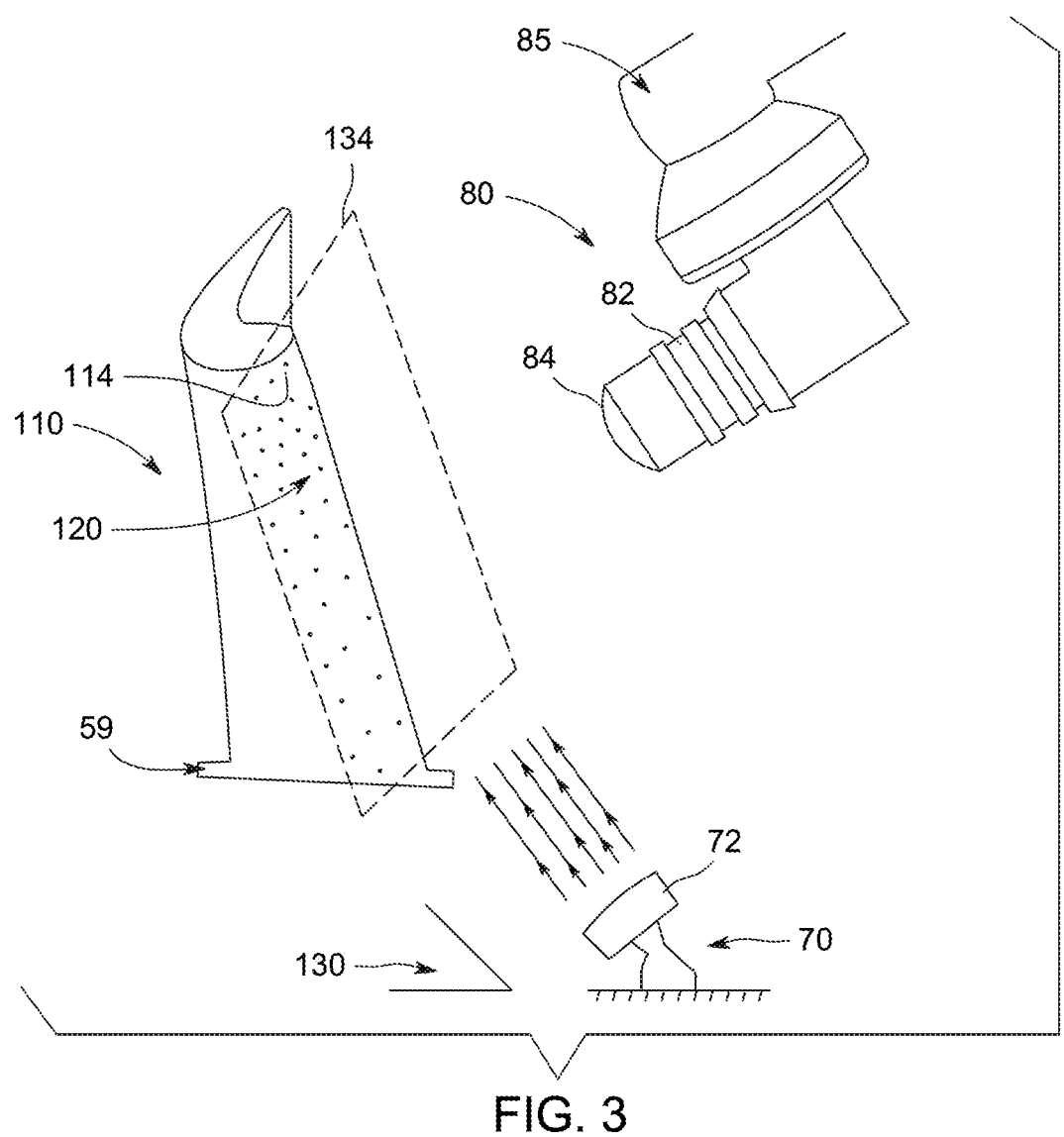
FIG. 3 depicts a schematic view of a portion of the fluid flow orifice locating system for locating fluid flow orifices on a component of a turbomachine, in accordance with an exemplary embodiment.

Referring to FIG. 3, a turbomachine component 110 is secured to component holding fixture 59. Turbomachine component 110 may take the form of a compressor portion component such as a compressor nozzle and/or compressor bucket or a turbine portion component such as a turbine nozzle and/or turbine bucket. Turbomachine component 110 includes a surface 114 having plurality of fluid flow orifices 120. Fluid flow orifices 120 provide passage of a cooling fluid from an internal portion (not separately labeled) of turbomachine component 110. Once mounted in processing chamber 54, light source 70 is arranged at a non-perpendicular angle 130 relative to surface 114. In accordance with an aspect of an exemplary embodiment, light source 70 is directed upwardly onto surface 114. Multi-axis manipulator 85 guides image capture device 80 to establish a field of view (FOV) 134 that encompasses all of surface 114.

Figure 4:
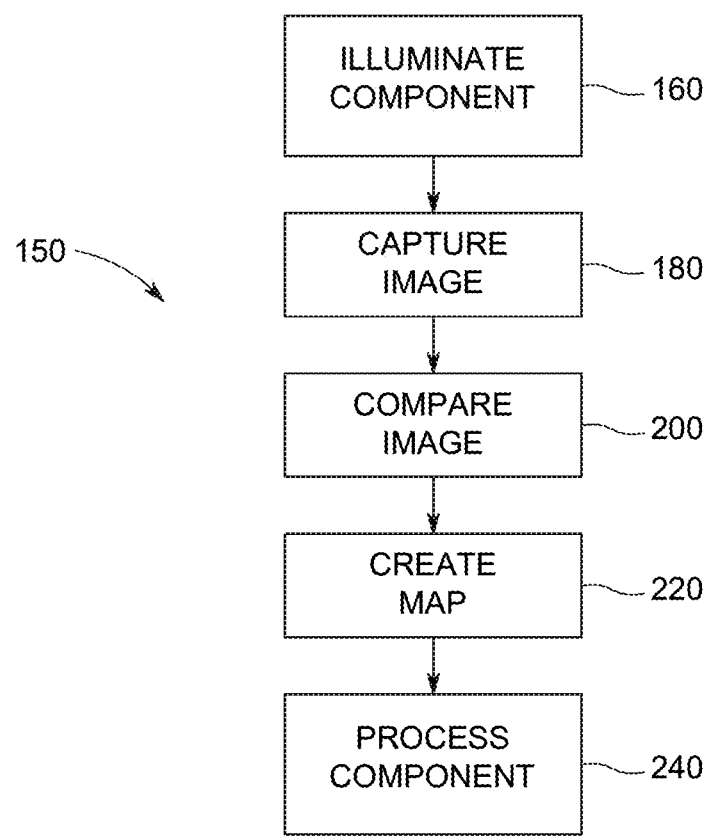
FIG. 4 depicts a flow chart illustrating a method for locating fluid flow orifices on a component of a turbomachine, in accordance with an exemplary embodiment.

Reference will now follow to FIG. 4 in describing a method 150 of locating fluid flow orifices 120 on turbomachine component 110. In block 160 light source 70 is activated to illuminate surface 114 of turbomachine component 110. The illumination of surface 114 creates contrast differences caused by shadows cast by the plurality of fluid flow orifices 120. An image is captured by image capture device 80 in block 180. In block 200 controller 90 compares the captured image to stored data. The stored data may be a previously captured image and/or engineering or computer-aided design (CAD) data for turbomachine component 110. CAD data may include both two dimensional (2D) and three-dimensional (3D) drawing files.

Controller 90 creates a fluid flow orifice map 210 in block 220. Fluid flow orifice map 210 comprises a computer generated data file including a location, in space, defined by x, y, and z coordinates for each of the plurality of fluid flow orifices 120. The fluid flow orifice map should not be understood to necessitate a mapping of fluid flow orifices relative to other fluid flow orifices 120 on surface 114, but rather represent a location, in space, of each fluid flow orifice on surface 114. However, controller 90 may also determine a location of each fluid flow orifice 120 relative to others of the fluid flow orifices 120 if desired. At this point, turbomachine component 110 may be subjected to a processing step by processing system 99, in block 240. For example, using the fluid flow orifice map created in block 220, processing system 99 may perform one or more of a fluid flow orifice clearing operation, a masking operation, a braze injection operation and/or a mask removal operation. If desired, controller 90 may also determine a location of fluid flow orifices 120 that may be covered by masking or brazing by evaluating contrasts on surface 114 to further aid in processing. Processing system 99 may also perform additional operations as selected by a user.

At this point, it should be understood that the exemplary embodiments describe a system that accurately locates fluid flow orifices on a turbomachine component. The fluid flow orifices are mapped with x, y, and z coordinates which may be provided to a processing system. The above-described system reduces processing time and may identify all fluid flow orifices in a single operation. Further, the system reduces the need for multiple operator interactions such that processing is substantially automated once a component is mounted in the processing chamber.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A fluid flow orifice locating system for locating fluid flow orifices on a component, comprising:
    a light source configured to illuminate a surface of the component to create contrast differences on the surface of the component, which are caused by shadow cast by the fluid flow orifices, wherein the light source is mounted obliquely relative to the surface of the component;
    an image capture device configured to capture the contrast differences on the surface of the component;
    a processing system comprising a multi-axis manipulator supporting the image capture device, wherein the processing system is configured to selectively position the image capture device relative to the surface using the multi-axis manipulator and to perform one or more clearing operations on the component; and
    a controller operably connected to the image capture device and the processing system, the controller being configured and disposed to create a fluid flow orifice map of the component based on the captured contrast differences on the surface of the component, wherein the processing system is configured to use coordinates on the orifice map to move the multi-axis manipulator to perform the one or more clearing operations on the component.

2. The fluid flow orifice locating system according to claim 1, wherein the light source comprises white light emitting diodes (LEDs).

3. The fluid flow orifice locating system according to claim 1, wherein the light source is mounted remote from the image capture device.

4. The fluid flow orifice locating system according to claim 1, wherein the multi-axis manipulator is further configured to perform at least one of a masking operation, a braze injection operation, and a mask removal operation on one or more of the fluid flow orifices of the component.

5. A method of locating fluid flow orifices on a component, comprising:
    directing a light source at the component at an oblique angle relative to a surface of the component;
    illuminating a surface of the component with the light source to create contrast differences on the surface of the component, which are caused by shadow cast by the fluid flow orifices;
    capturing an image of the contrast differences on the surface of the component;

creating a fluid flow orifice map of the surface of the component from the image of the contrast differences on the surface of the component, wherein the orifice map includes coordinates that identify each of a plurality of fluid flow orifices on the component; and perform one or more clearing operations on the component based on the coordinates on the orifice map.

6. The method of claim 5, wherein creating the fluid flow orifice map includes comparing the image with a previously captured image.

7. The method of claim 5, wherein creating the fluid flow orifice map includes comparing the image with an engineering drawing.

8. The method of claim 5, wherein the component includes a turbomachine component.

9. The method of claim 5, wherein illuminating the surface of the component with the light source includes exposing the surface of the component to one or more light emitting diodes (LED).

10. The method of claim 5, further comprising: performing one or more of a masking operation, a braze injection operation, and a mask removal operation on one or more of the fluid flow orifices of the component using the coordinates on the orifice map.

11. The method of claim 5, wherein creating a fluid flow orifice map of the surface of the component from the image includes locating fluid flow orifices covered by one of a mask and a braze.

12. The method of claim 5, wherein creating a fluid flow orifice map of the surface of the component includes creating a fluid flow orifice map of the component.

13. A turbomachine system comprising:
a compressor portion including a compressor portion component;
a turbine portion including a turbine portion component; and
a fluid flow orifice locating system for locating fluid flow orifices on the compressor portion component or the turbine portion component, the system comprising:
  a light source configured to illuminate a surface of the compressor portion component or the turbine portion component to create contrast differences on the surface of the compressor portion component or the turbine portion component, which are caused by shadow cast by the fluid flow orifices, wherein the light source is mounted obliquely relative to the surface of the component;
  an image capture device configured to capture the contrast differences;
  a processing system comprising a multi-axis manipulator supporting the image capture device, wherein the processing system is configured to:
    selectively position the image capture device relative to the surface using the multi-axis manipulator; and
    perform one or more clearing operations on at least one of the compressor portion component and the turbine portion component; and
  a controller operably connected to the image capture device and to the processing system, the controller being configured and disposed to create a fluid flow orifice map of the compressor portion component or the turbine portion component based on the captured contrast differences, wherein the processing system is configured to use coordinates on the orifice map to move the multi-axis manipulator to perform the one or more clearing operations on at least one of the compressor portion component and the turbine portion component.

14. The turbomachine system according to claim 10, wherein the processing system is configured to use the coordinates to move the multi-axis manipulator to perform at least one of a masking operation, a braze injection operation or a mask removal operation on one or more of the fluid flow orifices of the compressor portion component or the turbine portion component.

* * * * *